(12) United States Patent
Nottingham

(10) Patent No.: US 7,774,980 B2
(45) Date of Patent: Aug. 17, 2010

(54) HYDROMULCH CONTAINER MEDIUM

(76) Inventor: George Pierce Nottingham, 3595 Aiken Ct., Wellington, FL (US) 33414

( * ) Notice: Subject to any disclaimer, the term of this patent is extended or adjusted under 35 U.S.C. 154(b) by 93 days.

(21) Appl. No.: 11/625,598

(22) Filed: Jan. 22, 2007

(65) Prior Publication Data

US 2008/0120906 A1 May 29, 2008

Related U.S. Application Data

(60) Provisional application No. 60/861,329, filed on Nov. 28, 2006.

(51) Int. Cl.
A01G 23/04 (2006.01)
(52) U.S. Cl. .................. 47/65.7; 47/73; 47/9; 47/76
(58) Field of Classification Search .............. 47/74, 47/9, 77, 76, 32, 32.3, 32.7, 32.8, 1.01 P, 47/63, 66.3, 66.4, 84, 65.7
See application file for complete search history.

(56) References Cited

U.S. PATENT DOCUMENTS

| | | | | |
|---|---|---|---|---|
| 1,775,837 A | * | 9/1930 | Wedge | 47/74 |
| 1,775,838 A | * | 9/1930 | Wedge | 47/74 |
| 1,871,050 A | | 8/1932 | Eveland | |
| 1,964,689 A | * | 6/1934 | Quillen et al. | 47/74 |
| 2,616,220 A | * | 11/1952 | Welch, Jr. | 47/58.1 R |
| 3,469,341 A | * | 9/1969 | Bourget et al. | 47/74 |
| 3,973,355 A | | 8/1976 | McKenzie | |
| 4,034,508 A | * | 7/1977 | Dedolph | 47/84 |
| 4,035,951 A | * | 7/1977 | Dedolph | 47/65.7 |
| 4,168,962 A | | 9/1979 | Lambeth | |
| 4,241,537 A | | 12/1980 | Wood | |
| 5,307,589 A | * | 5/1994 | Rigsby | 47/59 R |
| 5,501,037 A | * | 3/1996 | Aldokimov et al. | 47/60 |
| 5,855,091 A | * | 1/1999 | Santoiemmo | 47/59 R |
| 6,546,701 B2 | * | 4/2003 | Weder et al. | 53/474 |
| 6,698,724 B1 | * | 3/2004 | Traeger et al. | 256/1 |
| 6,990,913 B2 | | 1/2006 | Pedrazzoli | |
| 2002/0162273 A1 | | 11/2002 | Stein et al. | |
| 2007/0163173 A1 | * | 7/2007 | Savich | 47/58.1 R |

FOREIGN PATENT DOCUMENTS

| | | | | |
|---|---|---|---|---|
| JP | 11192028 A | * | 7/1999 | |
| JP | 11243794 A | * | 9/1999 | |
| JP | 2005000176 A | * | 1/2005 | |
| JP | 2005333951 A | * | 12/2005 | |

* cited by examiner

Primary Examiner—Rob Swiatek
Assistant Examiner—Kristen C Hayes
(74) Attorney, Agent, or Firm—Christie, Parker & Hale, LLP

(57) ABSTRACT

A hydromulch container medium including a container and a root system disposed in the container. A hydraulically compactable mulch is interspersed between the root system and the container to form a semi-solid container medium around the root system.

18 Claims, 5 Drawing Sheets

HYDROMULCH CONTAINER MEDIUM

CROSS-REFERENCE TO RELATED APPLICATIONS

This application claims priority under 35 U.S.C. 119(e) to U.S. Provisional Application Ser. No. 60/861,329 filed Nov. 28, 2006, the entire contents of which is hereby incorporated by reference.

FIELD OF INVENTION

The present invention relates to plants in containers and more specifically to a hydromulch container medium.

BACKGROUND

When a plant, such as a tree, a bush or a shrub, is harvested for transplanting or transplanted from one place to another, it is advisable to leave a certain amount of soil around a root system of the plant. This network of roots and the soil clinging to the roots is known as a root ball, no matter the size or shape. This root ball is necessary to provide protection, moisture and nutrients to the roots.

Many growers start growing plants in containers rather than in the ground, or transplant saplings or semi-mature plants from the ground into containers to mature. Further, a plant may be transplanted from smaller containers into larger containers once the plant outgrows the smaller container. Also, a plant may be transplanted from the ground into a container for transportation to a local distributor or end user. In each instance, the root ball is usually maintained, but additional soil must be added to the container to fill any gaps and voids between the root ball and the container to protect the roots and support the plant in the container. This soil may be a clean soil or may contain various additives.

Plant containers come in various sizes to accommodate the root balls of various size plants. For example, a three gallon container can be ten inches in diameter and a fifteen gallon container can be seventeen inches in diameter. The root ball plus the amount of soil necessary to fill these containers makes the containers heavy. For example, a semi-mature Queen Palm tree, approximately 60 inches high, in a fifteen gallon container may weigh around 80 pounds. The excessive weight makes the plant difficult to move and transport, raising the risk of injury for those moving the plant. Further, the excessive weight makes the plant expensive to ship, as shipping costs increase with increasing weight.

Further still, soil in a plant container can be messy. The soil may spill from the container during shipping and handling, often due to vibration that occurs during loading and transit of the plant. This may cause damage to the roots of the plant and/or spillage of soil from the top of the container. Also, if enough soil spills from the container, the plant itself may shift in the container. Such shifting could damage roots, branches or surrounding plants. Spilled soil may also cause a mess in the shipping vehicle, leading to safety concerns and cleanup costs. If the plant is being transplanted indoors, for example, into a hotel or mall, any spilled soil may damage floors or carpets. Also, damage often occurs to the roots of the plant when removing the root ball from the container, as well as when moving the root ball to its final location.

When transplanting a plant into a container, either from the ground or a smaller container, the extra soil may be added by a mechanized means or, more commonly, manually, both of which can be time intensive. For larger containers, the container must be filled with soil and the plant is then planted into this soil. Depending on the number of plants to be transplanted, this may take considerable time and require many workers.

SUMMARY

The present invention provides a hydromulch container medium and methods of hydraulically applying a hydraulically compactable mulch, such as hydromulch, to a plant in a container, to provide a light, stable hydromulch container medium which nurtures and protects the roots of a plant and supports the plant in the container.

In general, in one aspect, the invention features a hydromulch container medium, which includes a container with a root system disposed in it and a hydraulically compactable mulch interspersed between the root system and the container. In embodiments, there is a drainage system in a lower portion of the container.

In embodiments, the hydraulically compactable mulch is interspersed between the root system and the container by positioning the root system in the container and filling the container around the root system with an aqueous mixture of water and the hydraulically compactable mulch. The water is then drained out of the container to hydraulically compact the hydraulically compactable mulch around the root system.

In certain embodiments, a dry bed of filler is positioned in the container before the root system is positioned in the container. The root system is then positioned in the container on top of the dry bed of filler. In certain embodiments, the dry bed of filler is a dry layer of the hydraulically compactable mulch.

In general, in another aspect, the invention features a method for producing a hydromulch container medium which includes positioning a root system into a container. The container holds the root system and a filler material surrounding the root system. A hydromulch filler material is then hydraulically applied into the container and the hydromulch filler material is dried to form a semi-sold root ball.

In certain embodiments, a dry bed of filler is positioned in a bottom portion of the container prior to positioning the root system into the container. In certain embodiments, the dry bed of filler is a dry layer of the hydraulically compactable mulch.

In embodiments, hydraulically applying the hydromulch filler material includes filling the container around the root system with an aqueous mixture of water and the hydraulically compactable mulch. The water is then drained out of the container to hydraulically compact the hydraulically compactable mulch around the root system.

In embodiments, the root system includes a root ball. In some embodiments, the root ball may be formed from soil. In other embodiments, the root ball may be formed from hydromulch or a combination of soil and hydromulch. In some embodiments, the root system includes no soil.

In certain embodiments, the hydromulch includes additives such as tackifiers, fertilizers and fungicides.

In embodiments, the container includes a drainage system through which the water can drain. In certain embodiments, the drainage system includes a lower portion of the container having at least one hole. In other embodiments, the drainage system includes a semi-permeable material disposed over the hole.

In embodiments, the semi-solid root ball is removed from the container. In other embodiments, the semi-solid root ball is removed from the container and a protective coating is applied around the semi-solid root ball. In certain embodiments, the protective coating may be agricultural polymer, burlap, canvas and/or a plastic sheet.

In general, in another aspect, the invention features a plant in a container which includes a root system disposed in the container and a hydraulically compactable mulch compacted into and around the root system to form a filler material to encapsulate the root system.

In embodiments, the hydraulically compactable mulch is hydraulically compacted into and around the root system by positioning the root system into the container. The container holds the root system and a filler material surrounding the root system. An aqueous mixture of water and a hydromulch filler material is then hydraulically applied into the container. The water is then drained out of the container to hydraulically compact the hydraulically compactable mulch around the root system, thereby forming a semi-solid root ball. In certain embodiments, the semi-solid root ball is removed from the container and a protective coating is applied around the semi-solid root ball.

The invention can be implemented to realize one or more of the following advantages. The hydromulch container medium is a semi-solid mass, leading to a more stable container package (e.g., minimal or no loose particles) for transportation, handling and shipment. Damage to the root system caused by normal handling and vibrations of transporting a plant are minimized or eliminated. The hydromulch container medium may be 20-40% lighter than regular soil, thereby lowering shipping costs associated with the weight of the product shipped. The weight reduction also makes the container and plant easier to handle and move, particularly for an end user, such as a typical homeowner, who is attempting to handle and transplant the plant.

The semi-solid nature of the hydromulch container medium enables the transport of the plant laid on its side, such as in a vehicle, without soil coming out of the container and making a mess of the vehicle. When an end-user removes the plant from the container, the semi-solid nature of the hydromulch container medium enables a root ball to come out cleanly and protects the roots while the plant is being transplanted.

The semi-solid nature of the hydromulch container medium also enables transport of the plant without the container. For example, the grower may remove the root ball with the hydromulch container medium from the container, coat the root ball with an agricultural polymer and wrap the root ball with plastic. This enables the grower to reuse the containers, thereby resulting in cost savings as well as less waste in the form of discarded containers. This also enables easier installation by the end-user because the end-user simply removes the plastic wrap and places the plant in its final location. Further, because of the semi-solid nature of the hydromulch and the agricultural polymer, the root ball may be rolled on the ground without damaging the plant roots.

The hydromulch mixture may be easily prepared with additional additives, which are more evenly dispersed throughout the mixture. The hydromulch mix retains and distributes moisture to the roots more evenly than soil. Further, the hydromulch mix is disease and microbe free, which helps promote healthy plant growth.

Also, the time and labor necessary to fill a container with the hydromulch container medium is substantially less than to transplant with soil. A large number of containers may be filled from a hydromulch mixing machine that simply pumps the hydromulch mix into the container. This method enables just two people to fill many containers with little physical exertion.

Other features and advantages of the invention are apparent from the following description, and from the claims.

BRIEF DESCRIPTION OF THE DRAWINGS

Like reference numbers and designations in the various drawings indicate like elements.

DETAILED DESCRIPTION

Figure 1:
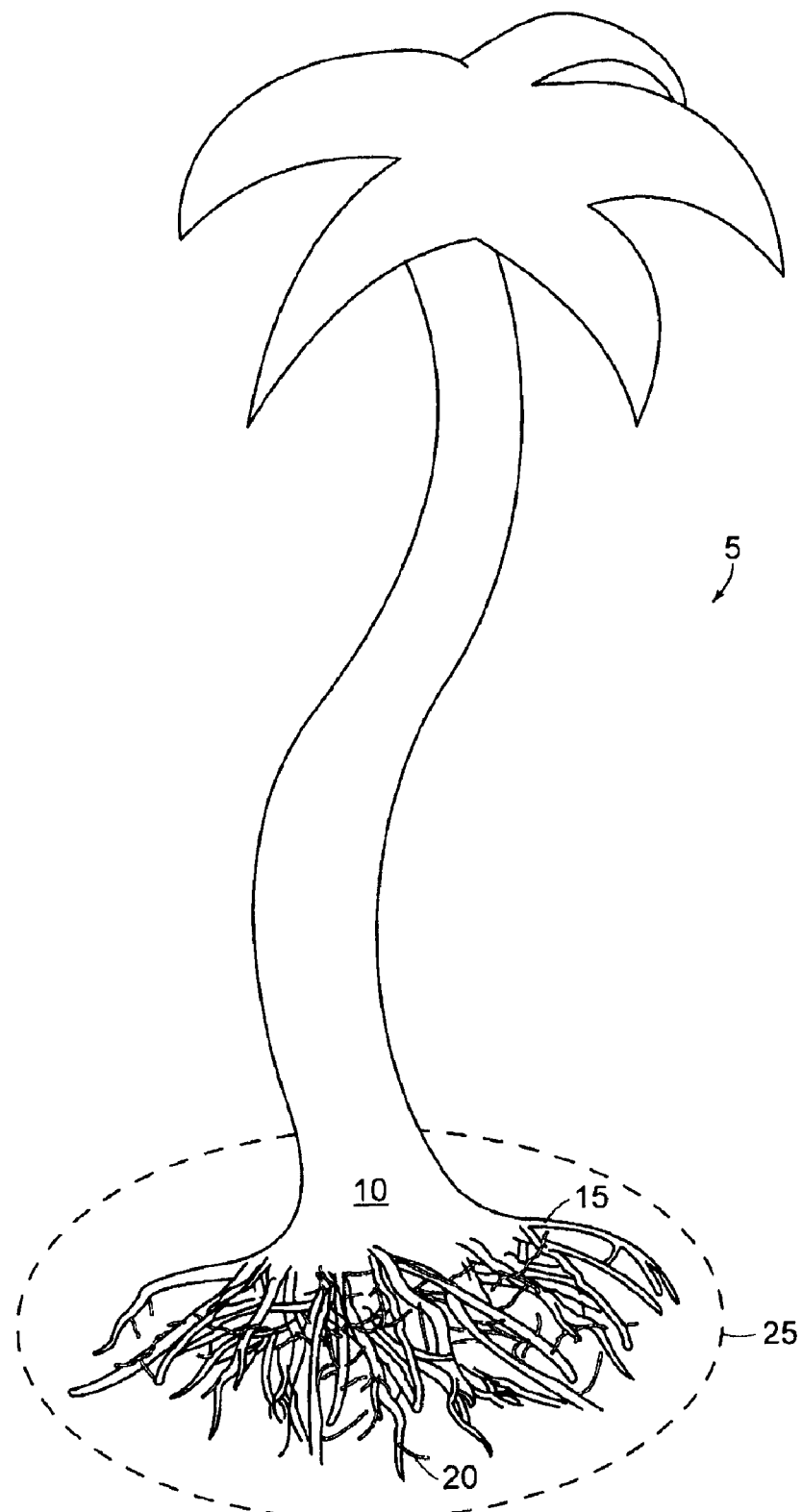
FIG. 1 is a front view of a tree and its root system encapsulated in a root ball.

As shown in FIG. 1, a tree 5 includes a root system 10 having larger roots 15 and finer roots 20. The finer roots 20 are important to help establish the tree when replanted because these finer roots 20 grow faster and gather more water and nutrients than the larger roots 15. The larger roots' 15 primary purpose is to provide support and anchorage for the tree 5, although they also gather water and nutrients for the tree 5. As can be seen, the root system 10 is a complex mass of larger roots 15 and finer roots 20.

When a tree 5 is removed from the ground or a container to be transplanted, the roots 15, 20 are generally left in a root ball 25 composed of soil from where the tree 5 was taken. Even if a root ball 25 is not maintained, soil will be trapped throughout the root system 10, unless the root system 10 is washed.

When a tree 5 is transplanted from the ground into a container, or from one container to a larger container, a filler must be added to the container to fill the space between the root ball 25 and sides of the container to protect the root system 10 and support the tree 5 in the container. The filler can be a hydraulically compactable mulch, such as a hydromulch product. Hydromulch is a ground-up wood fiber product, generally cleaned using a high heat process. The wood fiber may come from trees, wood pulp, paper pulp or any other cellulose product. An example of a commercially available hydromulch is EnviroBlend© Hydraulic Mulch, available from Profile Products LLC of Conover, Buffalo Grove, Ill. Because the wood fiber product is generally cleaned using a high heat process, the hydromulch is a clean product (e.g., contains no contaminates or spores, such as insects, microbes, bacteria or fungi, which could cause damage to the plant's root system). The hydromulch or hydromulch mixture (described below) may also include tackifiers as hardening agents (such as Con Tack Organic© Tackifier, available from Profile Products LLC of Conover, Buffalo Grove, Ill.), fertilizers or fungicides in a hydromulch mix to help nurture the tree 5 until it is replanted in the ground.

Figure 2:
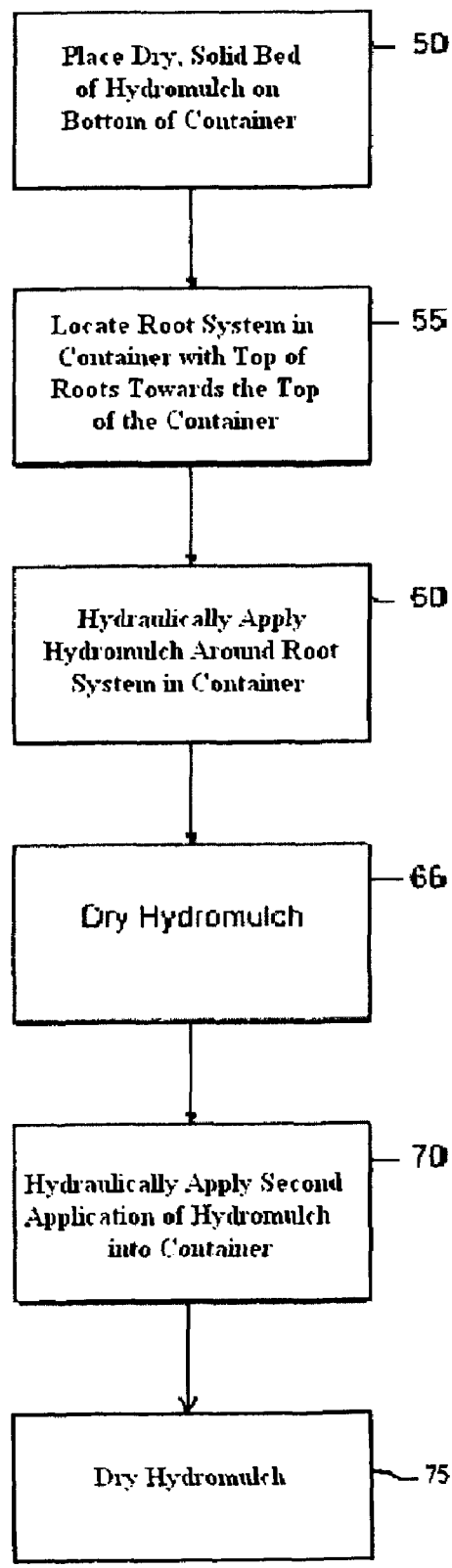
FIG. 2 is a flow diagram of general steps to fill a container containing a root system of a plant according to one embodiment of the invention.
Figure 3:
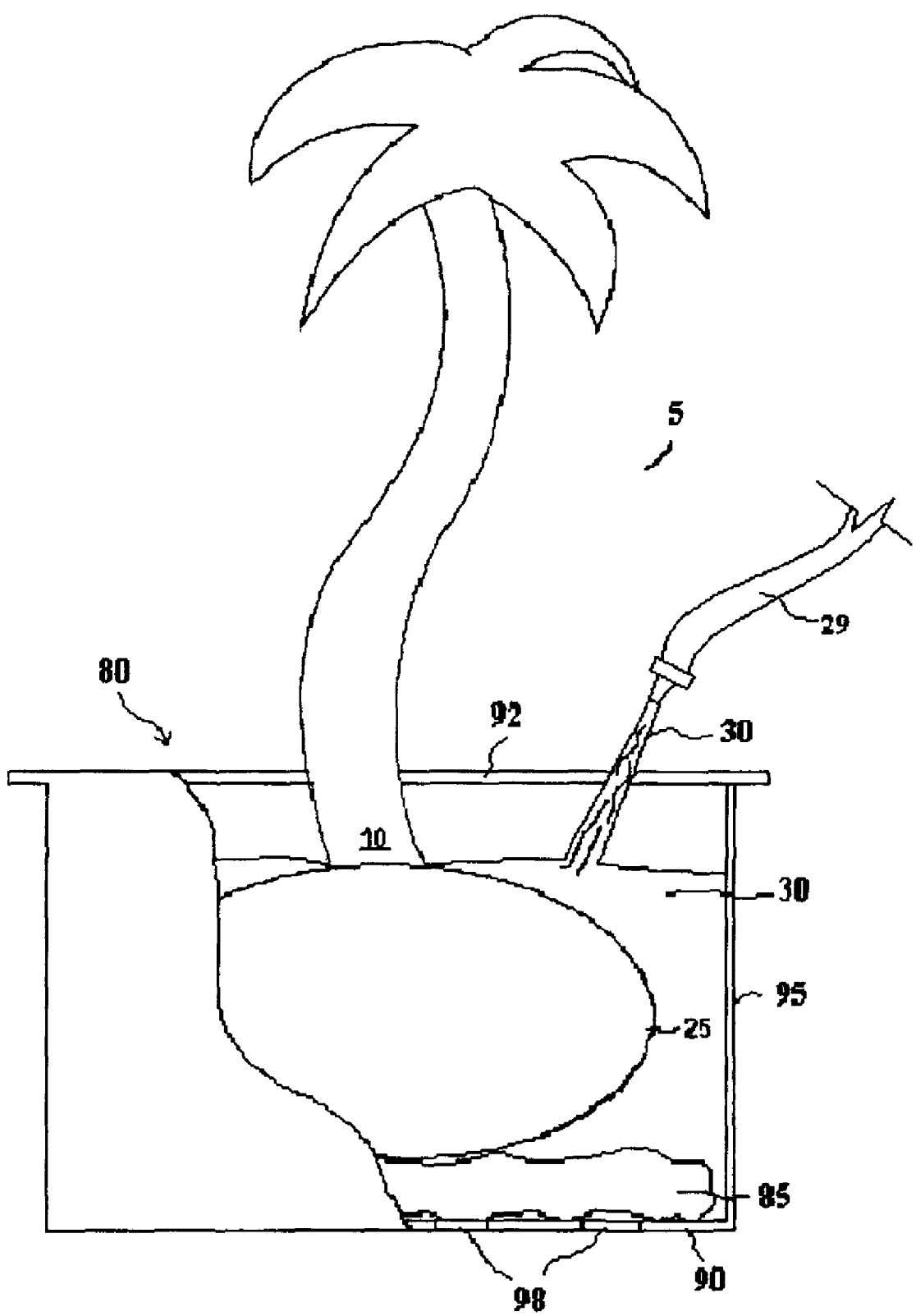
FIG. 3 is a cut-away view of an exemplary container including a hydromulch container medium according to an embodiment of the invention.

Referring to FIGS. 2 and 3, an exemplary process of preparing a tree 5 in a container 80 may include placing (50) a dry, solid bed of hydromulch 85 on a bottom 90 of the container 80. The bed of hydromulch 85 keeps the root system 10 and/or root ball 25 of the tree 5 off the bottom 90 of the container 80 and helps locate (55) the root system 10 towards a top 92 of the container 80. Once the root system 10 is properly located (55) in the container 80, a hydromulch mixture 30 is hydraulically applied (60) through a hose 29 into the container 80 around the root system 10 and/or root ball 25, filling any voids between the root system 10 and/or root ball 25 and the side 95 of the container 80. The water in the hydromulch mixture 30 drains away from the root system 10 and/or root ball 25 through openings 98 in the bottom 90 of the container 80. As the water drains away, the hydromulch in the hydromulch mixture 30 hydraulically compacts around the root system 10 and/or root ball 25, thereby forming a semi-solid hydromulch container medium. The hydromulch is thereafter permitted to dry (65) around the root system 10 and/or root ball 25, thereby further compacting. If, as the hydromulch dries, it shrinks and pulls away from side 95 of the container 80, a hydromulch mixture may again be hydraulically applied (70) to fill the voids and thereafter be permitted to dry (75). Thereafter, the plant is set aside to allow the root system to further cultivate through the hydromulch (e.g., root out).

In a specific example, a bed of dry hydromulch is placed on the bottom of a 15-gallon container (17-inch diameter). A semi-mature Queen Palm tree with a 10-inch root ball is placed into the container so that its root ball rests on the bed of dry hydromulch. A hydromulch mixture is prepared by mixing four bales of EnviroBlend© Hydraulic Mulch with 300-gallons of water, which is approximately a 12.5:1 water to mulch mixture by weight. One pound of starch tackifier (e.g., Con Tack Organic© Tackifier) is then added to the hydromulch mixture. Other additives may also be added, such as liquid fertilizer and liquid fungicide. The hydromulch mixture is hydraulically applied into the container until the container is filled. The water is drained from the container through and around the bed of dry hydromulch and out openings in the bottom of the container, enabling the hydromulch to hydraulically compact around the root ball. The bed of dry hydromulch helps prevent the hydromulch from also draining out of the openings in the bottom of the container. The moisture and the tackifier in the hydromulch mixture cause the bed of dry hydromulch to become part of the same final mass of hydromulch container medium.

The hydromulch is dried and permitted to settle for approximately two days. The hydromulch mix compacts tightly around the root ball, and may create small voids or gaps between the hydromulch and the side of the container. If such voids or gaps appear, another hydromulch mixture is prepared by mixing two bales of EnviroBlend© Hydraulic Mulch with 200-gallons of water, which is approximately a 16:1 water to mulch mixture by weight. A half-pound of tackifier is added to the hydromulch mixture as well. This hydromulch mixture is hydraulically applied into the container until the container is filled. The water is drained from the container through and around the previously applied hydromulch and out holes in the bottom of the container, enabling the hydromulch to hydraulically compact around the first application of hydromulch. The hydromulch is dried and permitted to settle for approximately two days. Afterwards, the plants are set aside for several months to allow the root system to further cultivate in the container; i.e., allowing the root system to root out throughout the hydromulch container medium.

Several containers with Queen Palm trees were prepared by this method. The containers were set aside and irrigated as necessary over three months. Over the three month period, the trees grew at a normal rate and developed healthy root systems that grew throughout the hydromulch and filled the containers. When removed from the containers, the hydromulch container medium formed a semi-solid root ball that did not lose its shape or shed any debris. These trees and containers weighed approximately 50 pounds. While the size of the tree will have an effect on the overall weight, this represents a 35-40% weight reduction over similar Queen Palm trees planted in soil in 15-gallon containers.

Figure 4:
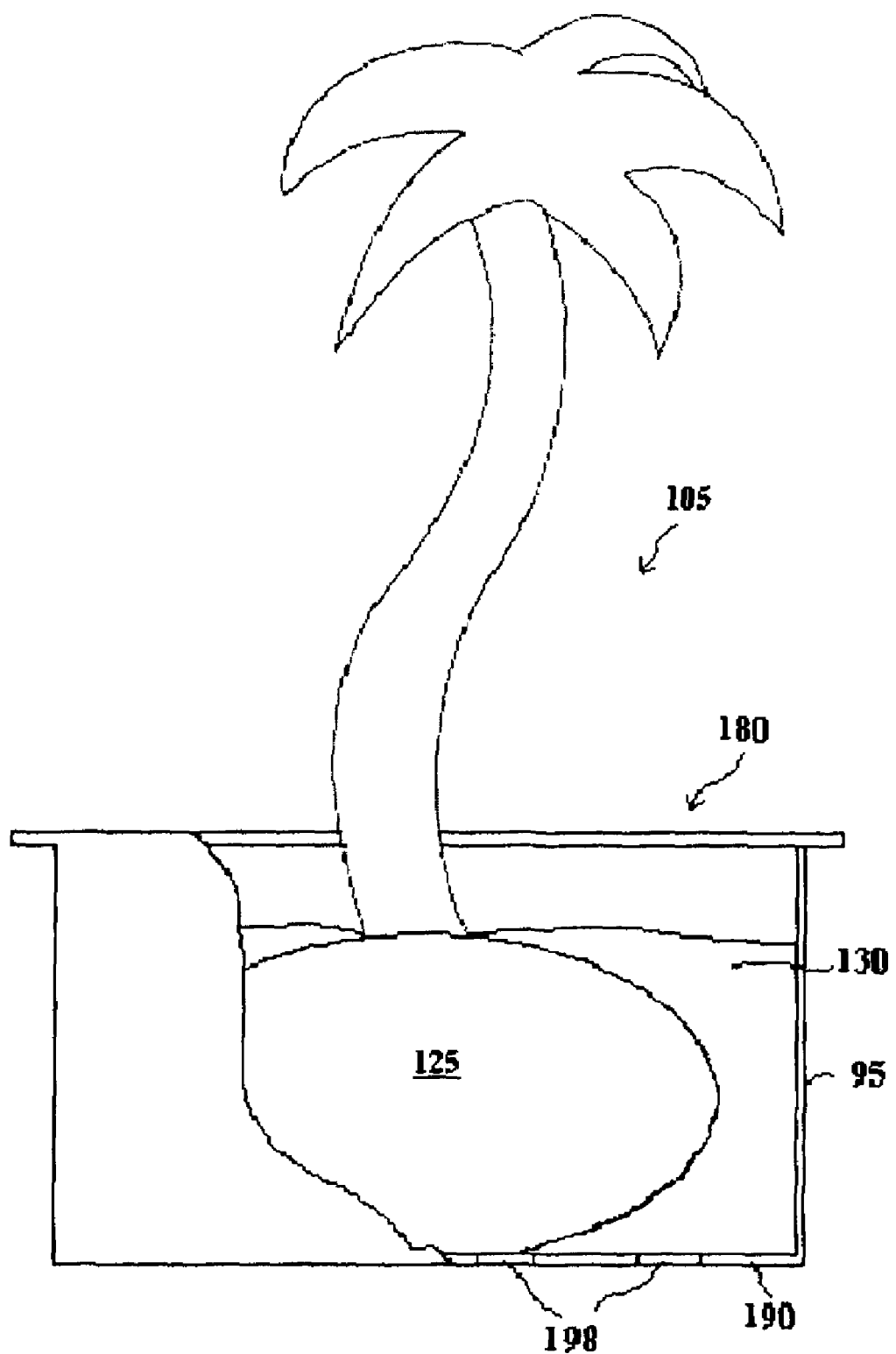
FIG. 4 is a cut-away view of an exemplary container including a hydromulch container medium according to another embodiment of the invention.

Referring to FIG. 4, in another embodiment, a root ball 125 of a tree 105 is placed on a bottom 190 of a container 180. A hydromulch mixture 130 is hydraulically applied around the root ball 125 in the same manner as described above until the container 180 is full. Water in the hydromulch mixture 130 drains out of the container 180 through openings 198 in the bottom 190 of the container 180, allowing the hydromulch to hydraulically compact around the root ball 125. The openings 198 are designed to permit the water to drain away from the container, while preventing the hydromulch from also draining out of the container. This may be accomplished by having small openings or having the openings covered by a semi-permeable material that will permit the water to drain while retaining the hydromulch.

Figure 5:
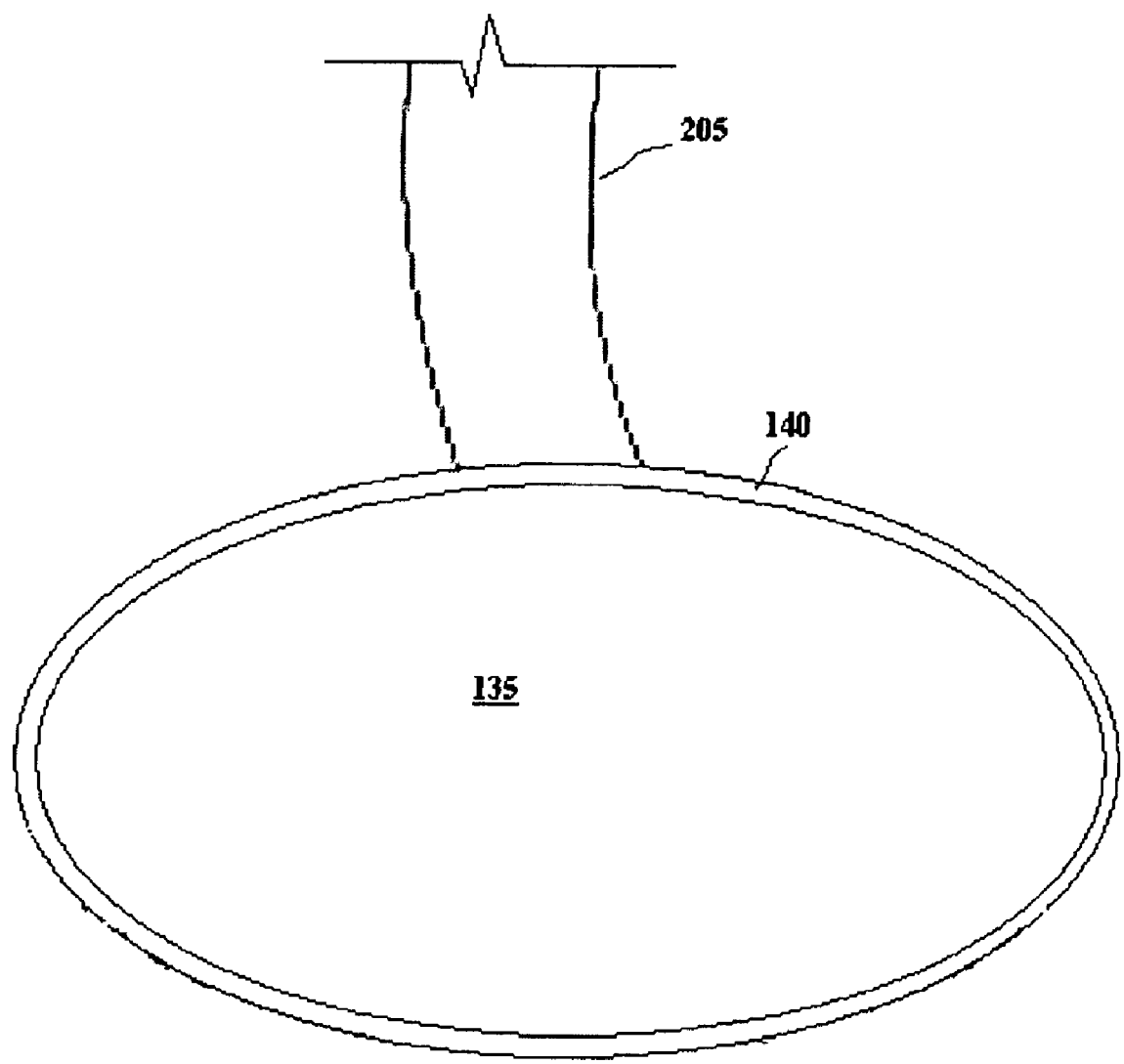
FIG. 5 is a front view of a tree and its root system encapsulated in a hydromulch container medium according to another embodiment of the invention.

Referring to FIG. 5, in another embodiment, a tree 205 is prepared by one of the methods described above and the root system permitted to root out into the hydromulch container medium, which roots typically will grown to the sides of the container in which the plant is prepared. The tree 205 may be removed from the container, which will result in a hydromulch root ball 135 around the root system (not shown). A solution containing agricultural polymer and water may then be applied to the hydromulch root ball 135 to provide a biodegradable protective shell 140 around the hydromulch root ball 135. For example, one (1) to one and three-quarters (1¾) cup of agricultural polymer, such as E-Tack Soil Control Agent (available from Finn Corporation of Fairfield, Ohio), may be mixed with 5-gallons of water to be applied to the hydromulch root ball 135. The agricultural polymer and water solution may be applied by any method, such as dipping the hydromulch root ball 135 into a vat of the solution or spraying the solution onto the hydromulch root ball. Agricultural polymer, such as thermal polyasparate or a combination of polyelectrolytes and polysaccharides, creates a semi-permeable layer that, once dry, hardens into a biodegradable plastic-like layer. Thereafter, the tree 205 may be transplanted with the agricultural polymer protective shell 140 retained on the root ball 135. The agricultural polymer protective shell 140 will biodegrade over a period of time, while allowing water and nutrients to reach the root system. The hydromulch root ball 135 with the agricultural polymer protective shell 140 may be further wrapped with a ultraviolet (UV) protective plastic wrap before sale and/or transport of the plant. The end user would only need to remove the UV protective plastic wrap before transplanting the plant with the hydromulch root ball 135 and agricultural polymer protective shell 140 directly into the ground. This embodiment has the advantage of being able to sell the tree 205 without a container, but with a light-weight, protected root ball that can be placed directly into the ground. Thereafter, the grower may reuse the containers to grow more plants, thereby reducing cost and disposables.

It is to be understood that the foregoing description is intended to illustrate and not to limit the scope of the invention, which is defined by the scope of the appended claims. Other embodiments are within the scope of the following claims. For example, while a tree has been described, the methods described can be used equally well on bushes and other plants. Also, while specific brand name products have been described, these specific products are not necessary to practice the methods described.

Further, while certain steps have been described, more or less steps may be used. For example, the root system may contain soil or a root ball before being treated with the hydromulch mixture, or the root system may be cleaned of all soil to produce a plant with a clean root system (e.g., no contaminates or spores, such as foreign insects, microbes, bacteria and fungi) for shipment to areas of the United States or the world that prohibit foreign soil (i.e., soil from outside that area).

Further still, while a tree with a soil root ball has been described, a tree previously prepared in a container with hydromulch may be removed from that container and moved to a larger container and again treated by the above described procedures.

Also, while certain mixtures of hydromulch and water have been described, other mixture ratios may be necessary with other plants having different root systems.

Further, because the hydromulch provides a stable root ball, the plant may be removed from the container and wrapped in a plastic film or burlap cloth for shipping or sale to an end user. This would allow a grower to reuse the same containers several times, as well as eliminate the difficulties an end-user may encounter while removing a root ball from a container.

Further still, the dry bed of hydromulch can be produced in any suitable manner. For example, a container can be partially filled with a hydromulch mixture, the water in the hydromulch mixture permitted to drain away, and the hydromulch hydraulically compacted in place. In another embodiment, the dry bed of hydromulch can be produced in large sheets in other containers. The hydromulch mixture can be sprayed into a large container, such as large, specially designed forms. The water is drained to enable the hydromulch to hydraulically compact and dry. The bed of hydromulch is then cut from these larger sheets as needed.

Also, although the dry bed of filler has been described as a dry bed of hydromulch to keep the root system 10 and/or root ball 25 off the bottom 90 of the container 80 and help locate the root system 10 towards the top 92 of the container 80, any filler may be used as the dry bed of filler.

What is claimed is:

1. A hydromulch container system comprising:
    a root system disposed in a hydromulch container wherein the hydromulch container is a compactable hydromulch comprising a finely ground-up fibrous material in a near liquid state hydraulically compacted under pressure around the root system to encapsulate the root system without void spaces.

2. The hydromulch container system of claim 1 wherein a lower portion of the container comprises a drainage system.

3. The hydromulch container system of claim 1 wherein the compactable hydromulch is hydraulically compacted around the root system by:
    positioning the root system in the container;
    filling the container under pressure around the root system with the compactable hydromulch; and
    draining the container.

4. The hydromulch container system of claim 1 wherein the compactable hydromulch hydraulically compacted around the root system further includes a dry bed of filler positioned along a bottom surface of the compactable hydromulch.

5. The hydromulch container system of claim 4 wherein the dry bed of filler is a dry layer of hydraulically compactable hydromulch.

6. A method of producing a hydromulch container system comprising:
    positioning a root system into an outer container, the outer container configured to hold the root system and a hydromulch comprising a finely ground-up fibrous material in an aqueous solution;
    hydraulically applying the hydromulch under pressure into the outer container and surrounding the root system;
    drying the hydromulch to form a hydromulch container system, said container system encapsulating the root system with no void spaces between individual roots in the root system; and
    removing the encapsulated root system from the outer container.

7. The method of claim 6 further comprising placing a dry bed of filler into a bottom portion of the outer container prior to positioning the root system into the outer container.

8. The method of claim 7 wherein the dry bed of filler is a dried layer of hydromulch.

9. The method of claim 6 wherein hydraulically applying the hydromulch comprises:
    filling the outer container around the root system with the hydromulch; and
    draining the aqueous solution out of the outer container.

10. The method of claim 6 wherein the root system is at least partially encapsulated in a root ball.

11. The method of claim 10 wherein the root ball is selected from the group consisting of soil, hydromulch and a combination of soil and hydromulch.

12. The method of claim 6 wherein the root system includes no soil.

13. The method of claim 6 wherein the mixture of hydromulch and water further comprises additives selected from the group consisting of tackifiers, fertilizers and fungicides.

14. The method of claim 6 wherein the outer container includes a drainage system through which water can drain.

15. The method of claim 14 wherein the drainage system comprises a lower portion of the outer container having at least one hole.

16. The method of claim 14 wherein the drainage system comprises:
    a lower portion of the outer container having at least one hole; and
    a semi-permeable material disposed over the hole.

17. The method of claim 6 further comprising applying a protective coating around the hydromulch container.

18. The method of claim 17 wherein the protective coating is selected from the group consisting of an agricultural polymer, burlap, canvas and a plastic sheet.

* * * * *

UNITED STATES PATENT AND TRADEMARK OFFICE
CERTIFICATE OF CORRECTION

| | | |
|---|---|---|
| PATENT NO. | : 7,774,980 B2 | Page 1 of 1 |
| APPLICATION NO. | : 11/625598 | |
| DATED | : August 17, 2010 | |
| INVENTOR(S) | : George P. Nottingham | |

It is certified that error appears in the above-identified patent and that said Letters Patent is hereby corrected as shown below:

In the Claims

Column 8, Claim 13, line 37        Delete "mixture of"

Column 8, Claim 13, line 38        Delete "and water"

Signed and Sealed this
Twelfth Day of April, 2011

David J. Kappos
*Director of the United States Patent and Trademark Office*